June 4, 1974  G. M. READE  3,814,785
HEAT STABILIZATION OF ORIENTED THERMOPLASTIC FILMS
Original Filed Dec. 30, 1969  2 Sheets-Sheet 2

3,814,785
HEAT STABILIZATION OF ORIENTED THERMOPLASTIC FILMS

Grahame Melvin Reade, Welwyn Garden City, England, assignor to Imperial Chemical Industries Limited, London, England
Continuation of abandoned application Ser. No. 889,171, Dec. 30, 1969. This application Sept. 1, 1972, Ser. No. 285,621
Claims priority, application Great Britain, Jan. 3, 1969, 479/69
Int. Cl. B29c 25/00; B29d 23/04
U.S. Cl. 264—89                                12 Claims

ABSTRACT OF THE DISCLOSURE

Heat setting tubular thermoplastic film by passing the inflated tube through a perforated sleeve and providing heated air under pressure between the sleeve and the exterior of the tube to balance the pressure inside the tube and venting said air to atmosphere.

---

Figure 1:
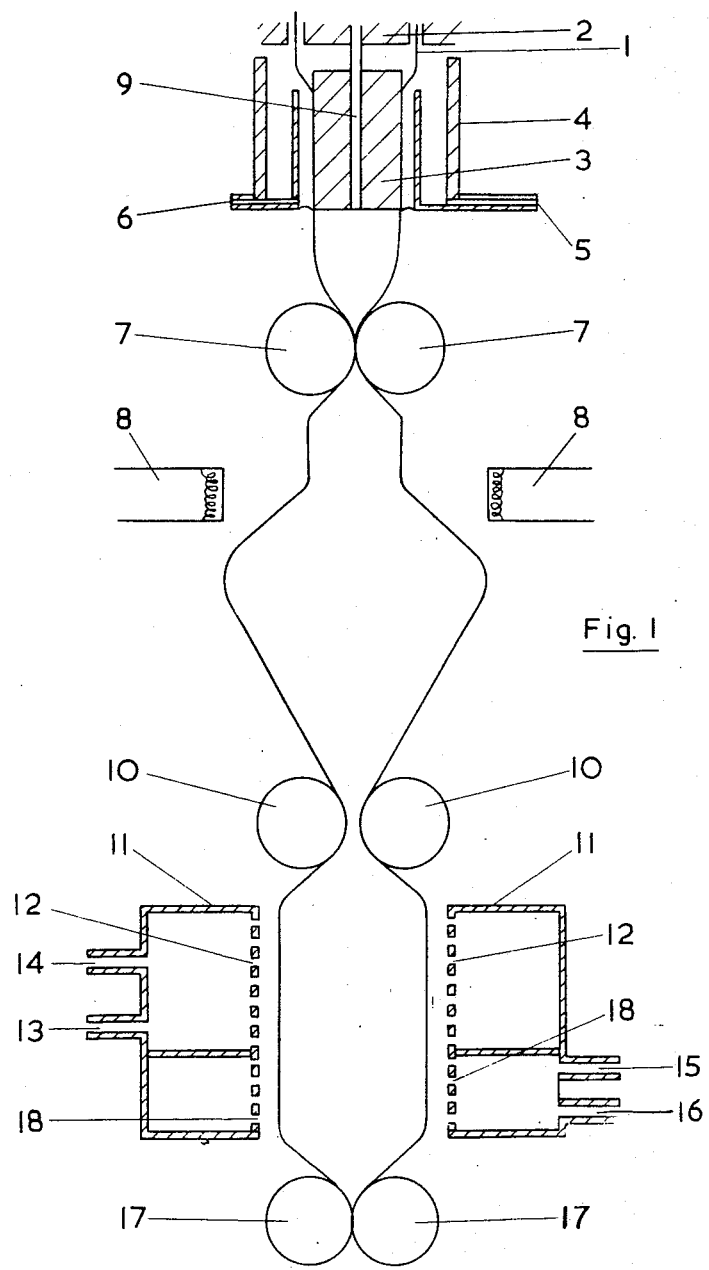

This is a continuation of application Ser. No. 889,171, filed Dec. 30, 1969, now abandoned.

The present invention relates to a process and apparatus for the heat stabilization of tubular films of oriented thermoplastic materials.

When a film of an organic thermoplastic crystalline or crystallizable polymeric material is drawn to cause molecular orientation therein and thereby bring about an improvement in its physical properties, the resulting film will normally have for many applications an undesirable high shrinkage at elevated temperatures. Proposals have been made for improving the dimensional stability at elevated temperatures by processes known as heat-setting operations. Further, when a tubular process has been used to cause biaxial orientation of the film the drawn films frequently exhibit sag, by which is meant variations in the length-wise dimensions of the film, for which geometrical factors and thermal non-uniformity in the drawing process are believed to be responsible. One of the previously proposed methods for heat-setting oriented films is to use a stenter in which the film is held under tension while it is heated to the required setting temperature. If this process is applied to film that has been produced by a tubular process, it is necessary to first slit the film so that it may be laid flat in the stenter. This process cannot, therefore, be used if the object is to produce shrink free tubular film. Tubular film is generally produced by expanding an extruded tube of the thermoplastic material with high internal air pressure and it has been proposed that the film may be heat-set while it is maintained in its tubular form. However, one difficulty that arises using this technique especially in the production of tubular polyethylene terephthalate film is that the temperature of the tube must be raised to a higher temperature during the heat-setting operation than that which is used during the stretching operation. It is, therefore, necessary to have a lower pressure drop across the tube when it is being heat-set than there is during the stretching operation because it is undesirable to stretch the film any further while it is being heat-set. The previously known process proposes that the zone in which the tube is heat-set should be sealed from the zone in which the film is stretched and that the gas which maintains the tube in its inflated state in the heat-setting zone should be provided by conrolled leakage of gas from the expansion zone. This process has the disadvantage that it is particularly difficult to control the leakage of the gas from the expansion zone to the setting zone and thus it is not possible to accurately control the pressure within the setting zone.

It is an object of the present invention to provide a process and apparatus whereby tubular oriented film of thermoplastic material may be heat treated so as to become substantially sag free and if desired have a low thermal shrinkage.

According to the present invention we provide a process for the heat treatment of tubular films of oriented thermoplastic materials comprising feeding a tube of oriented film filled with gas under pressure through a zone in which it is heated to the required heat treating temperature, in which zone gas is supplied under pressure to the outside of the tube to prevent any undesirable expansion of the tube.

The process of the present invention is particularly useful as part of a continuous process for the production of heat treated tubular films from oriented thermoplastic materials in which the tube is fed directly from the tubular orientation zone to the heat treating zone and the pressure within the tube in the heat treating zone is the same as the pressure in the orientation zone.

In the conventional tubular process for the manufacture of biaxially oriented films of thermoplastic material, an extruded tube of the thermoplastic material is first cooled and then reheated to the temperature at which it may be stretched to orient it and then stretched in a direction transverse to its direction of extrusion by internal gas pressure. At the same time the tube is also stretched in its direction of extrusion. The longitudinal and transverse stretching forces should not affect the tube immediately after it had been extruded and before it has been cooled and it is, therefore, necessary to provide some form of speed controlling device which controls speed of travel of the tube at a position between the extrusion orifice and the position where it is stretched to orient it.

Similarly means must be provided to prevent the pressure used to expand the tube from affecting the tube at its point of extrusion. The tube may be collapsed after it has been expanded by internal gas pressure by a means which as well as collapsing the tube withdraws the tube in its direction of extrusion at a rate greater than the feed control means mentioned above withdraws the tube from the extrusion orifice. Generally the device which collapses the expanded tube forms an air-tight seal within the tube thus trapping the air under pressure within the tube so that it causes the required degree of expansion of the tube. However, in the operation of the preferred process according to the present invention the device which collapses the expanded bubble does not form an air-tight seal in the tube but merely acts as a device which controls the speed at which the tube is travelling at that point. The tube may then be continuously fed from the zone in which it was expanded into the zone in which the heat treatment is effected and the internal gas pressure throughout both zones will thus be the same. The tube may then be finaly collapsed after it has passed through the treatment zone by a device which forms an air-tight seal across the tube. In a further preferred embodiment of the operation of the process of the present invention, the speed control devices at each end of the zone in which the tube is expanded comprise pairs of nip rolls of width less than that of the collapsed tube.

As a further embodiment of the present invention the device which collapses the tube after it has passed through the heat treatment zone may also stretch the tubular film in its longitudinal direction. In this way tubular film having additional strength in the direction along the axis of the tube may be obtained. In this way the tube is simultaneously stretched and heat treated in the heat treatment zone. If the device which controls the speed of the tube at the end of the tubular orientation zone consists of a pair of nip rolls which do not collapse the tube across its entire width and if the device which finally collapses the tube consists of a pair of nip rolls this additional stretching may conveniently be achieved by driving the final pair of nip rolls faster than those at the end of the orientation zone.

The heat treatment of the oriented tubular film is effected in the zone in which the tube is prevented from expanding by pressure applied to the outside of the tube. The tube may be heated to the desired heat treating temperature in any suitable manner, for example, it may be heated by infra-red radiation or as is preferred, the air which is used to balance the air pressure within the tube may be heated to the desired heat treating temperature. In our preferred process the tube is fed through a sleeve and gas at the required pressure is maintained between the walls of the tube and the inside of the sleeve. This gas may conveniently be supplied through perforations formed in the wall of the sleeve and may be heated to the required temperature by heaters provided in chambers formed behind the walls of the sleeve. An advantage of the heat treatment techniques of the present invention is that if the diameter of the inflated tube varies, this variation will be smoothed out during the heat treatment process because the diameter of any one element of the tube will be adjusted so that the pressure inside the tube is balanced by the applied pressure outside the tube and thus, even if tube of slightly varying diameter is fed to the heat treatment zone, tube of substantially constant diameter will be obtained after the heat treatment.

The extent to which the film is stabilized in the heat treatment zone is controlled by the time to which the film is subjected to elevated temperatures. Thus the faster the tube is travelling the longer must be the zone in which the tube is heated to achieve the same degree of heat treatment. We have found, however, that if the length of the sleeve which surrounds the tube in the heat treatment zone is substantially increased the tube tends to become trapped within the sleeve. This is thought to be because the tube is not of constant diameter as it enters the heat treatment zone and thus the clearance between the tube and the sleeve varies and zones of higher pressure are formed between the tube and the sleeve at the points where the tube is widest which prevents the tube passing smoothly through the sleeve.

We have found that this problem may be overcome by venting the sleeve to atmosphere at various positions along its length. The holes through which the zones of high pressure are vented to the atmosphere should not, however, be so big that the tube will be blown through the holes due to the air under pressure within the tube. We have found that this is desirable for satisfactory running when a tube of polyethylene terephthalate is being heat treated by passage through a sleeve at speeds greater than 30 ft./minute.

The temperature that are used for the heat treatment of the expanded film will, of course, depend on the nature of the thermoplastic material that is being processed. However, if it is desired to produce a shrink free film of polypropylene then a heat treatment temperature of between 100 and 145° C. is particularly suitable. On the other hand if shrink free polyethylene terephthalate is being produce, the heat treatment should preferably be in the range of 150 to 240° C. Although we have specifically described the processing conditions suitable for the production of polypropylene films and polyethylene terephthalate films our process is suitable for the treatment of oriented films of any thermoplastic crystalline or crystallizable polymeric material. For example, polymers and copolymers of α-olefins such as high density polyethylene, polypropylne or ethylene propylene copolymers, of poly-4-methyl-pentene-1, of polyesters such as polyethylene terephthalate and polyethylene-1,2-di-phenoxy ethane,4,4-dicarboxylate, and of the various nylons may be processed.

After the film has passed through the heat treating zone, it is collapsed by a means which forms an air-tight seal within the tube which may then be wound up on a reel. It is, however, important that the tube should not be sticky when it is collapsed and also that it should not be allowed to expand any further after the heat treatment. Thus, the high external pressure should be maintained around the tube until it has cooled to a temperature at which it cannot be expanded by the internal pressure. We prefer that the film be cooled after it has passed through the heat-setting zone by continuing the sleeve which in our preferred process forms the heat treating zone and supplying cooling gas at the required pressure to the outside of the tube as it passes through the final length of the sleeve. Alternatively, the tube may be passed through a liquid cooling bath but this is not our preferred process because it is then necessary to dry the film before it can be collapsed and wound into a reel.

The present invention also provides an apparatus for the production of heat treated tubular films of oriented thermoplastic materials comprising an extrusion die for extruding a tube of thermoplastic material, means for preventing an inflation pressure from rupturing the extruding material, means for drawing off the tube from the extrusion die, means for supplying an inflation pressure to the tube and means for hauling off the tube after inflation at a speed greater than that at which it is drawn off from the extrusion die which does not collapse the expanded tube across its entire width and beyond the said hauling off means, means for surrounding the expanded tube and means to heat the tube to the required heat treatment temperature and means to supply gas under pressure to between the expanded tube and the means surrounding it to prevent further undesirable expansion of the tube and means to collapse the heat treated tube across its entire width.

In the production of oriented films, it is generally necessary to cool the extruded tube and then reheat it to the temperature required for orientation. This may conveniently be achieved by either passing the extruded tube through an external water bath or by passing the tube over a cooled mandrel or by both these techniques. If the tube is cooled by an external water bath only, the means for preventing the inflation pressure from rupturing the extruding tube to which air under pressure is supplied between the tube and the sleeve to prevent the tube rupturing. If, however, the tube is cooled by passing it over an internal mandrel, then the air which generally provides the inflation pressure may be supplied through a tube which passes from the die through the mandrel. In this instance the tube will form a gas tight seal around the mandrel and thus the inflation pressure will be prevented from affecting the tube at its point of extrusion.

We prefer that the means for drawing off the tube from the extrusion die does not collapse the tube across its entire width because this leads to crease marks in the tube and to imperfections in the film obtained. Conveniently the draw off means comprises a pair of nip rolls of width less than that of the collapsed tube so that only the central portions of the collapsed tube are brought together in the nip. Alternatively, the draw off device may comprise two endless belts which grip the outside of the tube. When the draw off device does not collapse the tube across its entire width, the inflation pressure may conveniently be introduced through a tube which passes through the extrusion die. Although it is not our preferred method of operating the draw off device may comprise a pair of nip rolls which collapse the tube across its entire width and if this sort of draw off device is used, the inflation pressure may conveniently be introduced to the tube by a probe which passes from the extrusion die through the nip rolls.

After the extruded tube has passed the draw off device it is reheated to the orientation temperature by means such as hot air or infra-red heating and stretched in a direction transverse to its direction of extrusion by the high internal pressure and stretched in its direction of extrusion by virtue of the difference in speed between the draw off means and the haul off means. The stretch ratios that are used will, of course, depend on the nature of the polymer being processed.

In our preferred process and apparatus the means which hauls the tube off after it has been inflated should grip the tube but should not collapse it across its entire width so that the high internal pressure used to inflate the tube may pass beyond this haul off means into the heat treatment zone. The haul off means may, therefore, conveniently comprise a pair of nip rolls of width narrower than the width of the expanded tube when it is collapsed or may comprise a pair of moving belts which grip the outside of the tube but do not collapse it.

The stretched tube then passes into the heat treatment zone which conveniently comprises a sleeve surrounding the tube and air under pressure is introduced between the sleeve and the tube to balance the high internal pressure so that the tube will not be further expanded when it is heated to the heat treating temperature. The temperature of the tube may then be raised to the heat treatment temperature and most conveniently the tube is heated either by infra-red heating or by maintaining the air which is between the sleeve and the tube at the heat treating temperature. In our preferred apparatus, the heat treating zone comprises a perforated sleeve and air under pressure which is heated to the required heat treating temperature is introduced through the perforations in the sleeve to between the tube and the sleeve. The pressure of the air between the sleeve and the tube is maintained accurately so that it balances the internal pressure in the tube and thus any variations in the diameter of the tube that is fed to the heat treatment zone will be ironed out due to the pressure across the tube balancing each other out.

As previously set out the faster the tube is travelling the longer the heat treatment zone must be to achieve the same degree of heat treatment. However, in order to prevent the tube becoming trapped within the perforated sleeve in our preferred apparatus the sleeve is vented to atmosphere at various points along its length to prevent zones of very high pressure building up between the tube and the sleeve. The size of the holes through which the air is vented should be such that the zones of high pressure are vented as is required but that the tube is not blown through the holes due to the high pressure within the tube. The size of the holes will, therefore, be determined by the magnitude of the pressure within the tube, the total length of the heat treatment zone, the speed at which the tube is travelling and the temperature of the film.

In the production of polyethylene terephthalate film that is dimentionally stable at elevated temperatures the temperatures used in the heat treating zone are higher than those that are used in the biaxial stretching of the tube and thus the tube has a tendency to stretch further when it is heated to the heat treating temperature with a high internal pressure. It is, however, undesirable to allow any further transverse stretching of the tube and thus it is necessary to cool the tube to a temperature below that at which it will expand further before the high external pressure that is applied in the heat treatment zone to balance the internal pressure is removed. Therefore, in a preferred form of the present invention the sleeve surrounding the tube and forming the heat treatment zone is divided into at least two sections along its length, hot air under pressure being introduced to between the first section of the sleeve and the expanded tube so as to effect the heat treatment and cold air being supplied to between the tube and the second section of the sleeve so as to cool the tube to prevent any further expansion. The heat treated tube is then finally collapsed by a means which forms an air-tight seal across the tube and thus maintains the expanding pressure within the tube. This means conveniently comprises a pair of nip rolls which extend across the whole width of the collapsed tube. If it is required to produce tubing which has additional strength along its axis these nip rolls may be driven faster than the device which controls the speed of the tube at the end of the orientation zone so that the tube is further stretched as it passes through the heat treating zone.

The process and apparatus of the present invention are now illustrated but in no way limited by reference to the accompanying drawings in which FIG. 1 illustrates a tube of thermoplastic material 1 being extruded from an annular extrusion die 2 and immediately being cooled by passage over an internal mandrel 3 and through an external water bath 4 to which cooling water is introduced through a pipe 5 and removed from the outside surface of the tube under vacuum through pipe 6. The tube is drawn off from the extrusion die by a pair of contra-rotating nip rolls 7 which are of width narrower than that of the collapsed tube. The nip rolls preferably haul the tube away from the extrusion die at a rate greater than that at which it is being extruded so that it is hauled down on to the mandrel and thus forms an air-tight seal on the mandrel preventing the inflation pressure, which is introduced to the tube via pipe 9 which passes through the mandrel from rupturing the tube 1 at its point of extrusion. The tube is then reheated to its orientation temperature by passing through circular infra-red heaters 8 and then stretched in a direction perpendicular to its direction of extrusion by the high internal pressure introduced through pipe 9 and stretched in its direction of extrusion by means of the pair of contra-rotating nip rolls 10 which grip the tube and are rotating at a faster peripheral speed than the nip rolls 7. The nip rolls 10 do not collapse the film across its entire width and thus allow the high gaseous pressure introduced through pipe 9 to pass beyond these rolls into the heat treatment zone. The expanded tube then passes through the rolls 10 into the heat treatment zone which consists of a sleeve 11 surrounding the tube and provided with perforations 12 in its face adjacent to the tube. The sleeve 11 is divided into two compartments and heated gas under pressure is introduced into the upper compartment through pipe 13 and passes through the perforations 12 in the sleeve to surround the tube and thus balance the internal pressure at the same time as raising the temperature of the tube to that required for the heat treatment. Cold gas under pressure is introduced into the lower compartment of the sleeve through pipe 16 and flows through the perforations 18 in the surface of the sleeve to balance the internal pressure within the tube and to cool the tube so that when it emerges from the heat treating zone it will not be expanded by the high internal pressure. The gas pressure in the two compartments of the sleeve may be controlled by adjusting the pressure at which the gas is introduced and if necessary gas may be bled off from these compartments through pipe 14 of the upper compartment and pipe 15 of the lower compartment. The tube is finally collapsed across its entire width by a pair of contra-rotating nip rolls 17 so that the gas introduced into the tube through pipe 9 is trapped therein. The heat treated film may then conveniently be wound onto a reel and removed from the apparatus.

Figure 2:
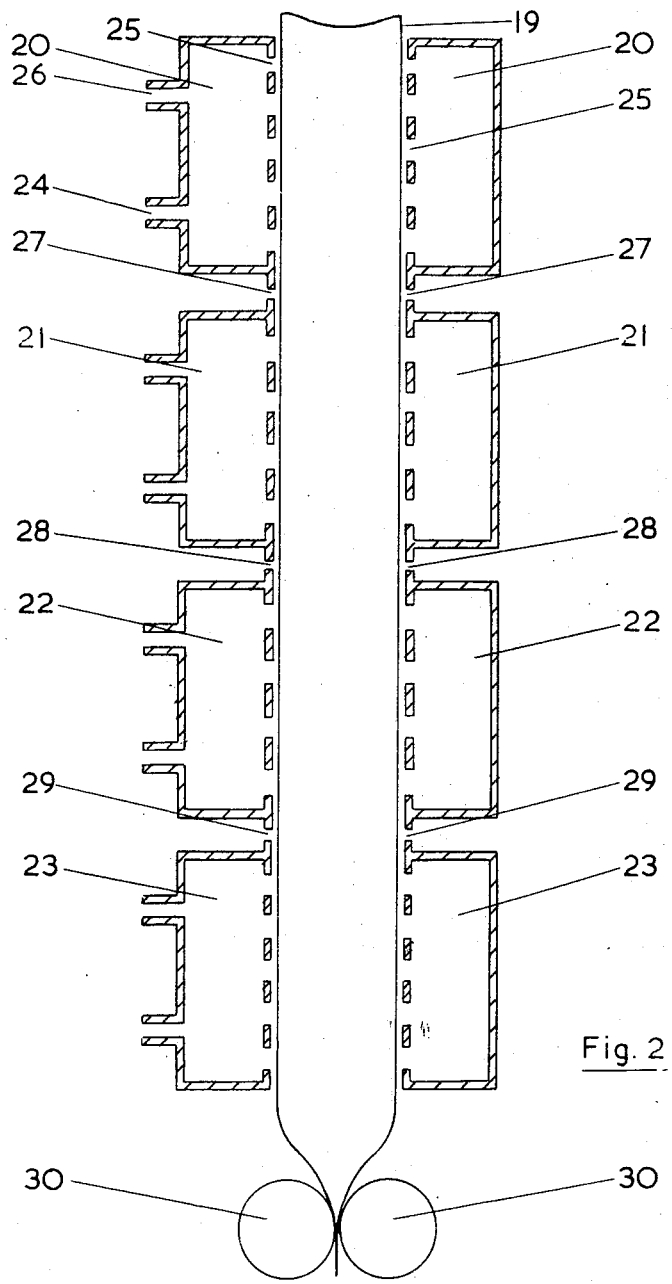

FIG. 2 illustrates a heat treatment zone suitable for use with tubular films travelling at high speeds. In FIG. 2 a tube 19 is shown passing through a heat treatment zone which consists of four cylindrical sections 20, 21, 22 and 23 surrounding the tube. Hot air is supplied to around the tube from sections 20, 21 and 22 and cold air is supplied from section 23. Hot air enters section 20 through pipe 24 and is supplied to around the tube through the perforations 25 in the inner wall of section 20. If the pressure builds up in section 20 hot air may be bled off from section 20 through exit pipe 26. Each of the four chambers supplies air to around the tube in a similar manner.

A clearance is allowed between each of the chambers through which air may be vented to atmosphere to prevent undesirably high pressures building up between the tube and the sleeve. Thus air may be vented to atmosphere through the rings of holes 27, 28 and 29 between the chambers 20 and 21, 21 and 22 and 22 and 23, respectively.

The heat treated tube is finally collapsed by the nip rolls 30 which form an air-tight seal across the tube and thus prevent air from escaping from within the tube. The present invention is illustrated but in no way limited by reference to the accompanying Examples in which a biaxially oriented tube of polyethylene terephthalate is heat treated to improve its dimensional stability at elevated temperatures. The biaxially oriented tube of polyethylene terephthalate used in the Examples was prepared by extruding polyethylene terephthalate from an annular extrusion die ⅞ inch in diameter at a rate of 25 lbs. per hour. Thee tube was rapidly cooled by being hauled over a ⁷⁄₁₆ inch diameter cold mandrel while simultaneously passing through an external cooling bath at a speed of 29 feet/minute. The tube was then reheated to a temperature of 85° C. and stretched in its direction of extrusion by withdrawing the tube from the stretching zone at a speed of 103 ft./minute; the tube was also stretched in the direction transverse to its direction of extrusion by supplying air at a pressure of 9 p.s.i. to within the tube which expanded the tube to a diameter of 45 millimeters. The wall thickness of the tube obtained varied from between 100 and 105 gauge.

The area shrinkage of the film was measured by taking a rectangular sample of the film of known dimensions and freely suspending the film for one minute in an air oven heated to a certain temperature. After one minute the dimensions of the piece of film are again measured and the decrease in the transverse dimension expressed as a percentage of the original transverse dimension of the sample. Similarly the percentage shrinkage in the machine direction is expressed in the same way. The area shrinkage is the sum of those two percentage shrinkages.

The area shrinkage of the polyethylene terephthalate film prepared as above was found to be 41.8% at 140° C.

EXAMPLE 1

The tube prepared as set out above was wound into a reel and subsequently heat treated by passage through a heat treatment zone of the type illustrated in FIG. 1. The tube was fed to the heat treatment zone at a speed of 25 ft./minute and filled with air at a pressure of 7 p.s.i. The treating zone consisted of a perforated sleeve 45.4 millimeters in diameter surrounding the tube and which consisted of a first piece 18.5 inches long and a second piece which was a 4-inch long continuation of the first piece. The part of the sleeve which was 18.5 inches long had 192 equispaced holes over its surface which faced the tube and all these holes were 0.025 inch diameter. Hot air was directed through these holes to around the tube, the air was supplied at a pressure of 30 p.s.i. to create a pressure of about 3 p.s.i. between the tube and the sleeve. The air temperature was such that the temperature of the sleeve itself was 235° C.

After passing through the heating zone the tube immediately passed through the second piece of the sleeve which was 4 inches long, 45.4 millimeters in diameter and had 80 equispaced holes on its inner surface. Cold air was supplied to around the tube from this sleeve to which the air was supplied at 35 pounds square inch.

Tubular film having a diameter of 45 millimeters and a wall thickness of between 102 and 106 gauge was obtained and the area shrinkage of the film was found to be 6.3% at 140° C.

EXAMPLE 2

The film prepared as described above was fed directly from the stretching zone to the heat treatment zone illustrated in FIG. 2. The tube 19 (see FIG. 2) was fed to the zone at 103 ft./minute and the air pressure inside the tube was 9 p.s.i. The tube was treated by hot air which was supplied to around the tube from chambers 20, 21 and 22 and cold air was supplied from chamber 23, all the chambers had an internal diameter of 45.7 millimeters. Chambers 20, 21 and 22 were all 17½ inches long and each had 184 equispaced holes of 0.032 inch diameter on its inner surface through which the hot air was supplied to around the tube. The chamber 23 is 18 inches long and had 192 equispaced holes of 0.032 inch diameter on its inner surface.

Air was supplied from chambers 20, 21 and 22 at a pressure of 50 p.s.i. which generated a pressure of 5.5 p.s.i. between the tube and the sleeve. The air supplied from chamber 20 raised the temperature of the inner surface of the chamber to 250° C. whereas the temperature of chamber 21 was 212° C. and that of 22 was 220° C. Cold air was supplied to around the tube from chamber 23 at a pressure of 55 p.s.i.

The chambers were spaced slightly apart from each other and a single row of 12 holes equally spaced around the circumference of the sleeve and having a diameter of 0.090 inch each are formed between adjacent chambers to vent the space between the tube and the sleeve to atmosphere.

The tubular film obtained was withdrawn from the heat treating zone at 105 ft./minute and had a final diameter of 45.5 millimeters and a wall thickness of between 102 and 106 gauge. The area shrinkage of the film was measured at various temperatures and found to be as follows:

| Temperature ° C.: | Area shrinkage percent |
|---|---|
| 120 | 4.5 |
| 130 | 5.4 |
| 140 | 6.2 |
| 150 | 8.5 |
| 160 | 10.9 |
| 170 | 13.5 |
| 180 | 16.1 |

I claim:

1. In a process for heat setting an oriented tubular film of thermoplastic material by feeding the inflated tubular film through a thermal treatment zone, cooling the thermally treated tube, and withdrawing the cooled tube the improvement comprising feeding the tube through at least two successive thermal treatment zones, heating the tube to the desired heat setting temperature in at least the first of said zones, cooling the heat treated tube in at least the last of said zones, providing a cushion of gas under pressure on the external surface of the tube in each of said zones, and venting said gas cushion to atmosphere between adjacent pairs of said zones thereby smoothing out variations in the diameter of the inflated tube.

2. A process according to claim 1 comprising passing the inflated tubular film through a sleeve having at least two successive perforated sections, creating a cushion of gas under pressure between the film and each of said sleeve sections by passing gas through said perforations, and venting said gas cushion to atmosphere between adjacent pairs of said sleeve sections.

3. A process according to claim 1 comprising supplying to the cushion in at least the first of said zones gas heated to the temperature at which the tubular film is to be heat set.

4. A process according to claim 1 comprising maintaining said gas cushion at a pressure of about 5.5 p.s.i.

5. A process according to claim 1 in which the oriented thermoplastic material is polyethylene terephthalate.

6. A process according to claim 1 comprising continuously feeding to the thermal treatment zone an oriented tubular film formed by extruding a tube of a crystalline or crystallizable thermoplastic material, shock cooling the extruded tube, reheating the tube to a temperature at which it may be stretched to orient it, stretching the tube in a direction transverse to its direction of extrusion by internal gas pressure, and stretching the tube in its direction of extrusion by withdrawing the tube at a rate greater than that at which it is fed to said reheating zone.

7. A process according to claim 6 wherein the tube is withdrawn from said reheating zone by means which do not form a gas tight seal in the tube whereby the same internal gas pressure is established with the tube throughout both the orienting and thermal treatment zones.

8. An apparatus for heat setting an oriented tubular film of a thermoplastic material comprising a tubular sleeve through which the inflated tubular film may be passed, said sleeve comprising at least two successive zones of perforations, means for supplying gas through said perforations to create a cushion of gas under pressure between the tubular film and sleeve in each of said zones, means between adjacent pairs of said zones to vent gas from said cushion to atmosphere, said vent means being so dimensioned as to permit escape to atmosphere of gas from said cushion while preventing the tubular film being blown therethrough, means to heat the tubular film to the required heat setting temperature in at least the first of said zones, and means to cool the tubular film in at least the last of said zones.

9. An apparatus according to claim 8 wherein the vent means comprises holes which are sufficiently small to prevent the tube being blown therethrough.

10. An apparatus according to claim 8 including a circular hollow chamber surrounding the perforated sleeve.

11. An apparatus according to claim 8 including an annular die for extruding a tube of thermoplastic material, means for preventing an inflation pressure from rupturing the extruding tube, means for drawing off the tube from the die, means for supplying an inflation pressure to within the tube, means for hauling off the tube after inflation and feeding the inflated tubular film to the tubular heat setting sleeve at a rate greater than that at which the tube is drawn off from the die and, beyond said heat setting sleeve, means to collapse the heat set tubular film across its entire width and to withdraw said film from the heat setting zone.

12. An apparatus according to claim 11 wherein said hauling off and feeding means collapses the inflated tubular film across only part of its width whereby the same internal pressure of gas may be established within the tubular film in both the inflating and heat setting zones.

References Cited

UNITED STATES PATENTS

| 2,916,764 | 12/1959 | Gerber | 264—95 |
| 3,544,667 | 12/1970 | Ebert et al. | 264—95 |

FOREIGN PATENTS

| 672,735 | 10/1963 | Canada | 264—95 |
| 977,661 | 12/1964 | Great Britain | 264—95 |

JEFFERY R. THURLOW, Primary Examiner

U.S. Cl. X.R.

264—90, 95, 210 R, 235, 346; 425—72, 326 R